US006731903B2

(12) United States Patent
Suzuki

(10) Patent No.: US 6,731,903 B2
(45) Date of Patent: May 4, 2004

(54) IMAGE FORMING APPARATUS

(75) Inventor: Toshimasa Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/232,604

(22) Filed: Sep. 3, 2002

(65) Prior Publication Data

US 2003/0049060 A1 Mar. 13, 2003

(30) Foreign Application Priority Data

Sep. 7, 2001 (JP) ........................................ 2001/272177

(51) Int. Cl.[7] .............................................. G03G 15/00
(52) U.S. Cl. ...................... 399/361; 271/279; 399/377; 399/405
(58) Field of Search ................................ 399/405, 407, 399/107, 361, 362, 367, 377; 271/279, 278; 347/138, 152; 358/500, 501, 400, 401, 474, 496, 497

(56) References Cited

U.S. PATENT DOCUMENTS

| 5,348,283 A | 9/1994 | Yanagi et al. ................ 271/127 |
| 5,370,380 A | 12/1994 | Suzuki et al. ................. 271/21 |
| 5,508,796 A | 4/1996 | Sasame et al. ................ 399/18 |
| 5,539,507 A | 7/1996 | Miyashiro et al. .......... 399/298 |
| 5,543,904 A | 8/1996 | Kato et al. .................. 399/335 |
| 5,580,042 A | 12/1996 | Taniguro et al. ............. 271/274 |
| 5,592,280 A | 1/1997 | Ishizuka et al. ............. 399/410 |
| 5,620,174 A | 4/1997 | Taniguro et al. ......... 271/10.12 |
| 5,648,808 A | 7/1997 | Yanagi et al. ................ 347/104 |
| 5,672,019 A | 9/1997 | Hiramatsu et al. .......... 400/624 |
| 5,725,319 A | 3/1998 | Saito et al. .................. 400/629 |
| 5,761,571 A | 6/1998 | Suzuki et al. .................. 399/66 |
| 5,881,351 A | 3/1999 | Shimotoso et al. .......... 399/377 |
| 5,999,760 A | 12/1999 | Suzuki et al. ................. 399/45 |
| 6,088,567 A | 7/2000 | Miyashiro et al. .......... 399/400 |
| 6,151,476 A | 11/2000 | Tsuruya et al. .............. 399/302 |
| 6,151,477 A | 11/2000 | Takeuchi et al. ............. 399/318 |
| 6,168,270 B1 | 1/2001 | Saikawa et al. ............. 347/104 |
| 6,304,742 B1 * | 10/2001 | Nunes et al. ................ 399/361 |
| 6,341,905 B1 | 1/2002 | Suzuki .................. 400/120.09 |
| 6,522,862 B2 * | 2/2003 | Koshimizu et al. .......... 399/405 |

FOREIGN PATENT DOCUMENTS

| EP | 59-176757 | | 10/1984 |
| EP | 59-176759 | | 10/1984 |
| JP | 05-134503 | * | 5/1993 |
| JP | 05-338904 | * | 12/1993 |
| JP | 09-230653 | * | 9/1997 |
| JP | 09-288393 | * | 11/1997 |

* cited by examiner

Primary Examiner—Sophia S. Chen
(74) Attorney, Agent, or Firm—Fitzpatrick, Cella, Harper & Scinto

(57) ABSTRACT

In an image forming apparatus having an image reading portion for reading an image, an image forming portion for forming an image on a sheet, and a sheet delivery portion provided above the image reading portion, the image reading portion is provided with an original transporting portion for transporting an original, an original tray portion as an original pressing portion openable and closable upwardly relative to the original transporting portion and for pressing the original, and a delivery tray portion.

6 Claims, 13 Drawing Sheets

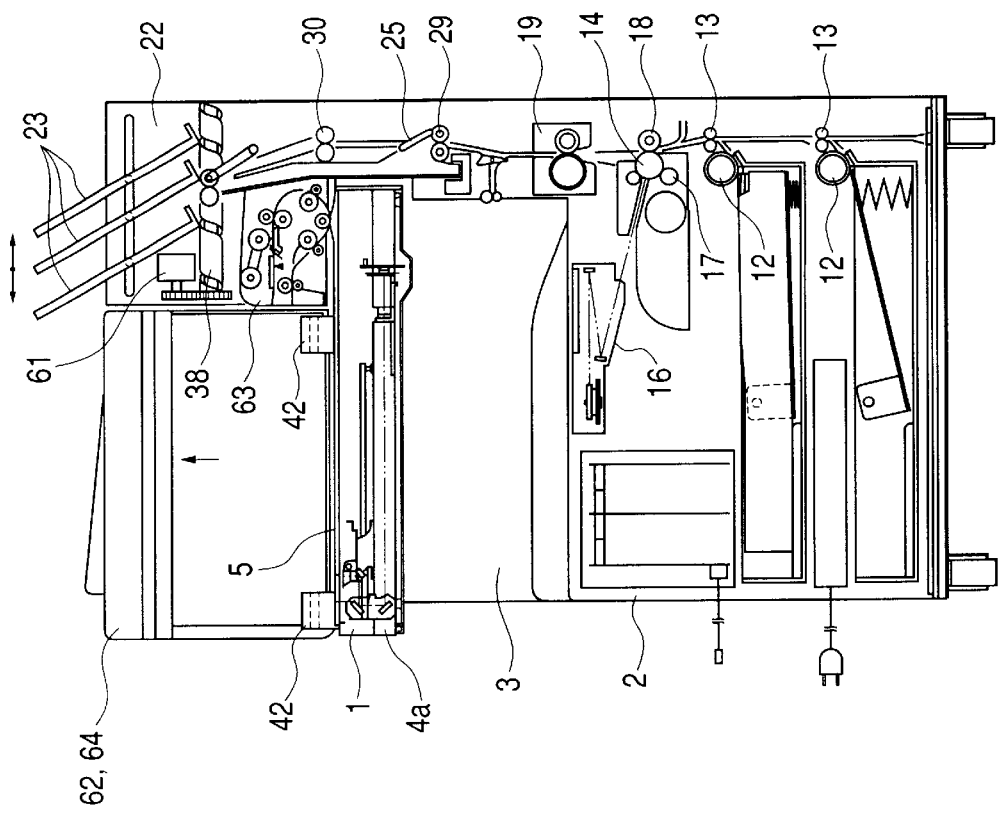
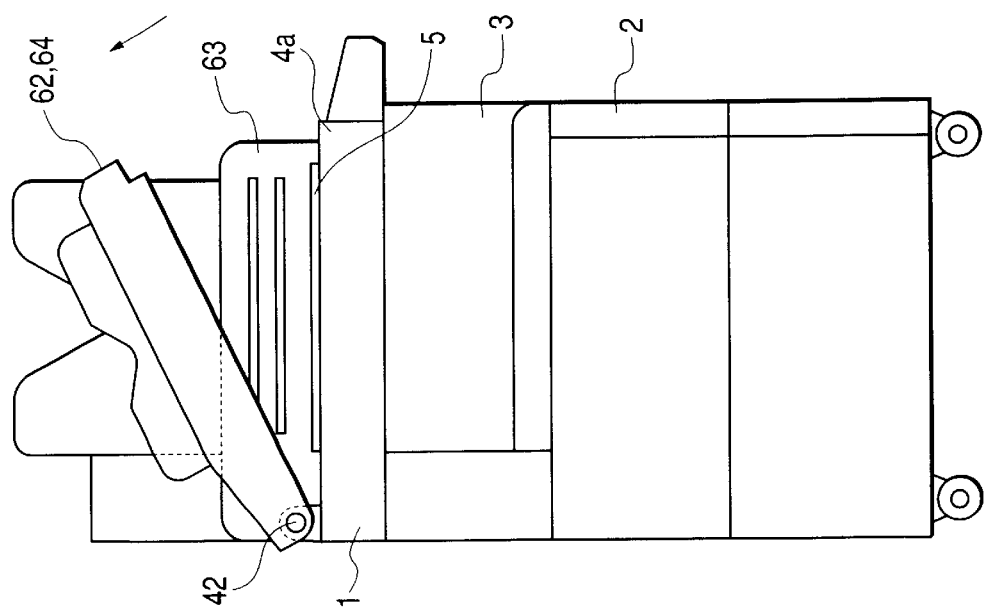

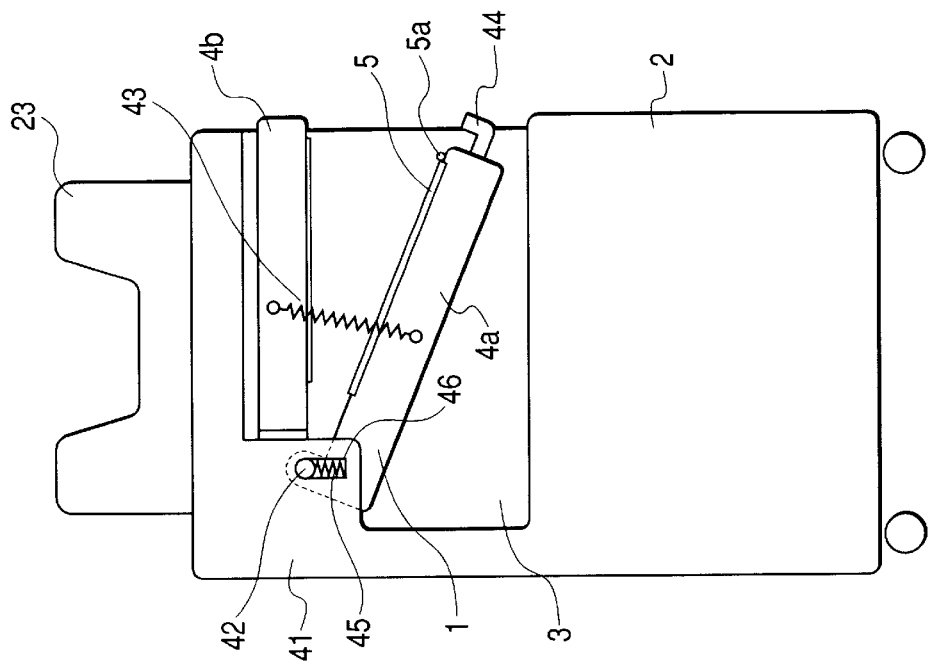
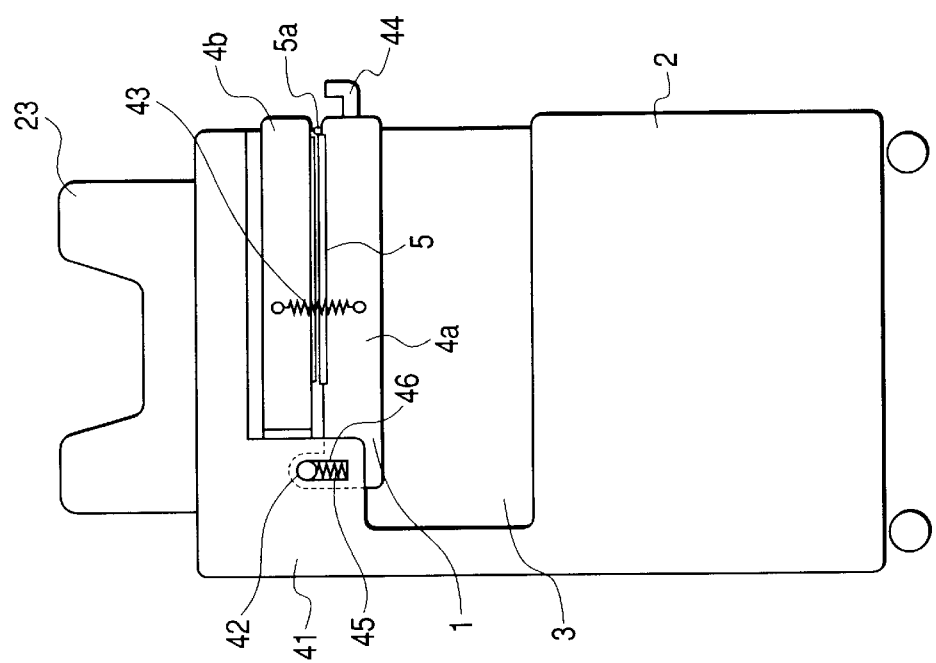

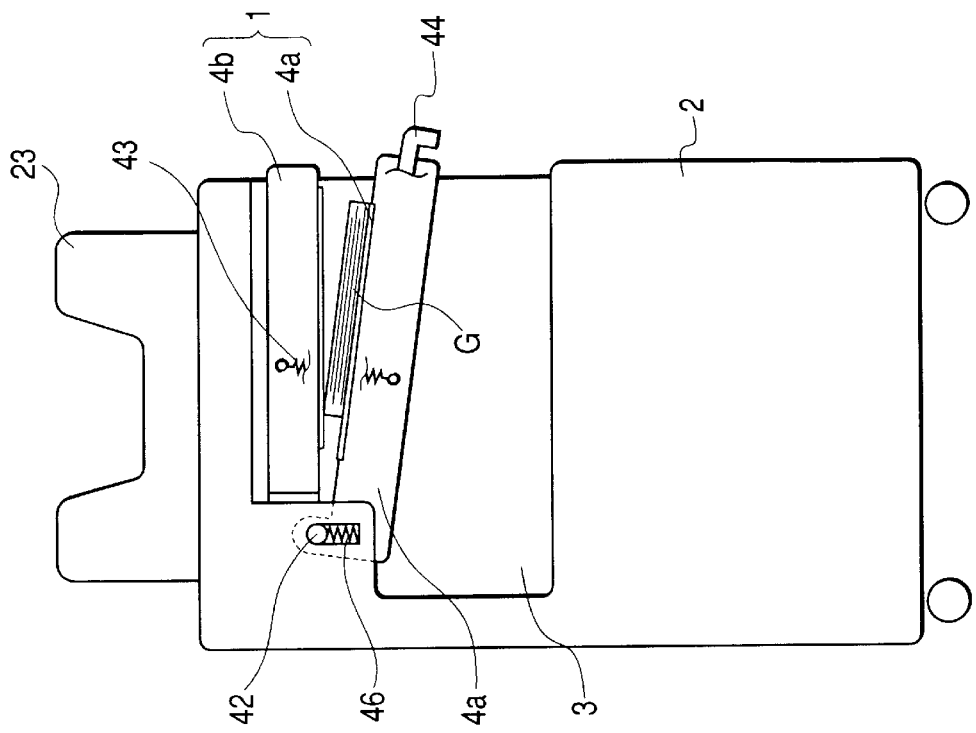
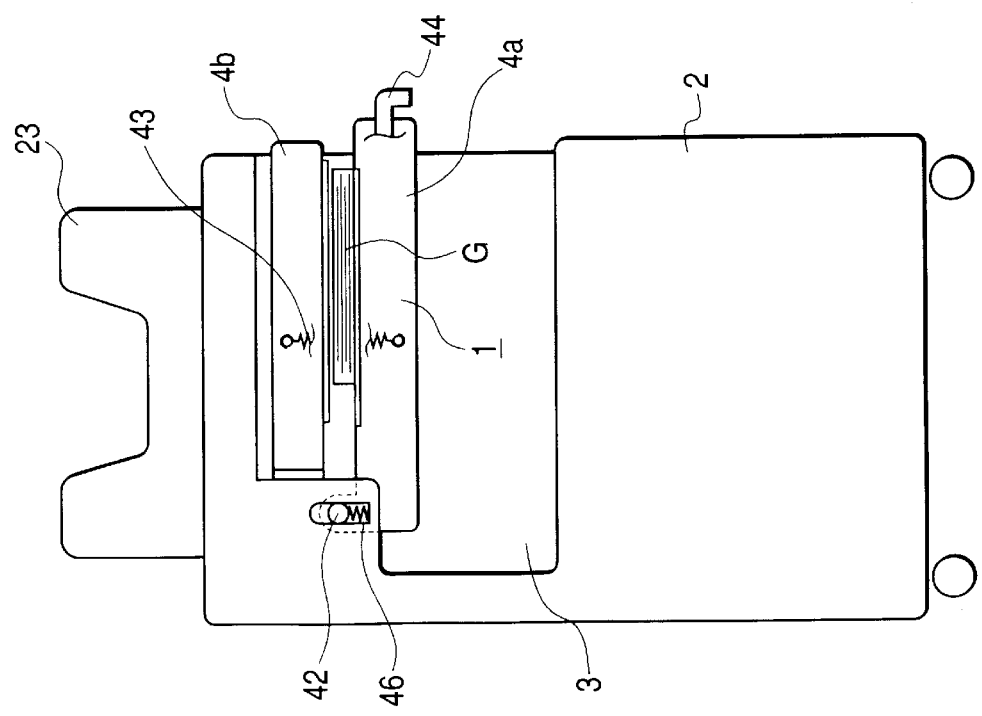

IMAGE FORMING APPARATUS

BACKGROUND OF THE INVENTION

1. Field of the Invention

This invention relates to an image forming apparatus for which the installation space can be made small and which is good in original setting operability. Particularly, it relates to an image forming apparatus of which the space saving can be realized without spoiling the visual confirmability and the taking-out operability of a delivered sheet.

2. Related Background Art

As an image forming apparatus provided with an original image reading portion such as a copying machine or a facsimile apparatus, an apparatus of a type in which an image reading portion is disposed in the upper portion of the apparatus and an image forming portion is provided below it and recording sheets on which images have been formed by the image forming portion are delivered outwardly from a side of the apparatus and are stacked is popular.

In recent years, however, there is available an apparatus as shown in FIG. 12 of the accompanying drawings wherein for the purpose of space saving, a space 103 is provided between an image reading portion 101 and an image forming portion 102 and recording sheets are delivered to and stacked in this space 103.

In the image reading portion 101, an original fed from an auto original feeder (hereinafter referred to as the "ADF") 109 disposed in the upper portion thereof is exposed and scanned, whereby image information is taken into a photoelectric transfer element and data processing is effected.

On the basis of the data, a laser scanner 104 scans on a photosensitive drum 105 to thereby effect latent image formation. A toner image developed on the photosensitive drum 105 in accordance with the latent image is transferred onto a sheet fed from a feed cassette 106, and passes through a fixing device 107 and is fixed on the sheet, which is then delivered to and stacked in the delivery space 103 by delivery rollers 108.

When in the image forming apparatus, sheets on which images have been recorded are to be subjected to such post-treatment as punching treatment or stapling treatment, as shown in FIG. 13 of the accompanying drawings, a sheet treating apparatus 110 is connected to a side of the main body of the apparatus, and the sheets are fed into this sheet treating apparatus 110 to thereby effect stapling treatment or the like.

However, when the sheet treating apparatus 110 is connected to a side of the apparatus, a wide installation space becomes necessary. If an attempt is made to make this space smaller, the structure of the apparatus will become complicated or the taking-out operability of the sheet will become bad.

SUMMARY OF THE INVENTION

The present invention has been made in view of the above-noted points and the object thereof is to provide an image forming apparatus of which the space saving can be realized without spoiling the visual confirmability and the taking-out operability of a delivered sheet.

A typical construction according to the present invention for achieving the above object has an image reading portion for reading an image, an image forming portion disposed below the image reading portion for forming an image on a sheet, and a sheet delivering portion provided above the image reading portion, and the image reading portion is provided with an original transporting portion for transporting an original, and an original pressing portion openable and closable upwardly relative to the original transporting portion and for pressing the original.

As described above, in the present invention, the original pressing portion is made openable and closable with the sheet delivering portion and the original transporting portion remain fixed above the image reading portion, and therefore the light-weight original pressing portion can be easily opened and closed.

BRIEF DESCRIPTION OF THE DRAWINGS

FIGS. 7A and 7B are a left side view and a cross-sectional view, respectively, showing a state in which the original pressing portion of an ADF is opened.

FIGS. 8A and 8B are side illustrations of the main body of the image forming apparatus according to the first embodiment as it is seen from the left side thereof.

FIGS. 9A and 9B are illustrations of the state when a thick original is read.

DESCRIPTION OF THE PREFERRED EMBODIMENTS

Image forming apparatus according to some embodiments of the present invention will hereinafter be described with reference to the drawings.

First Embodiment

Figure 1:
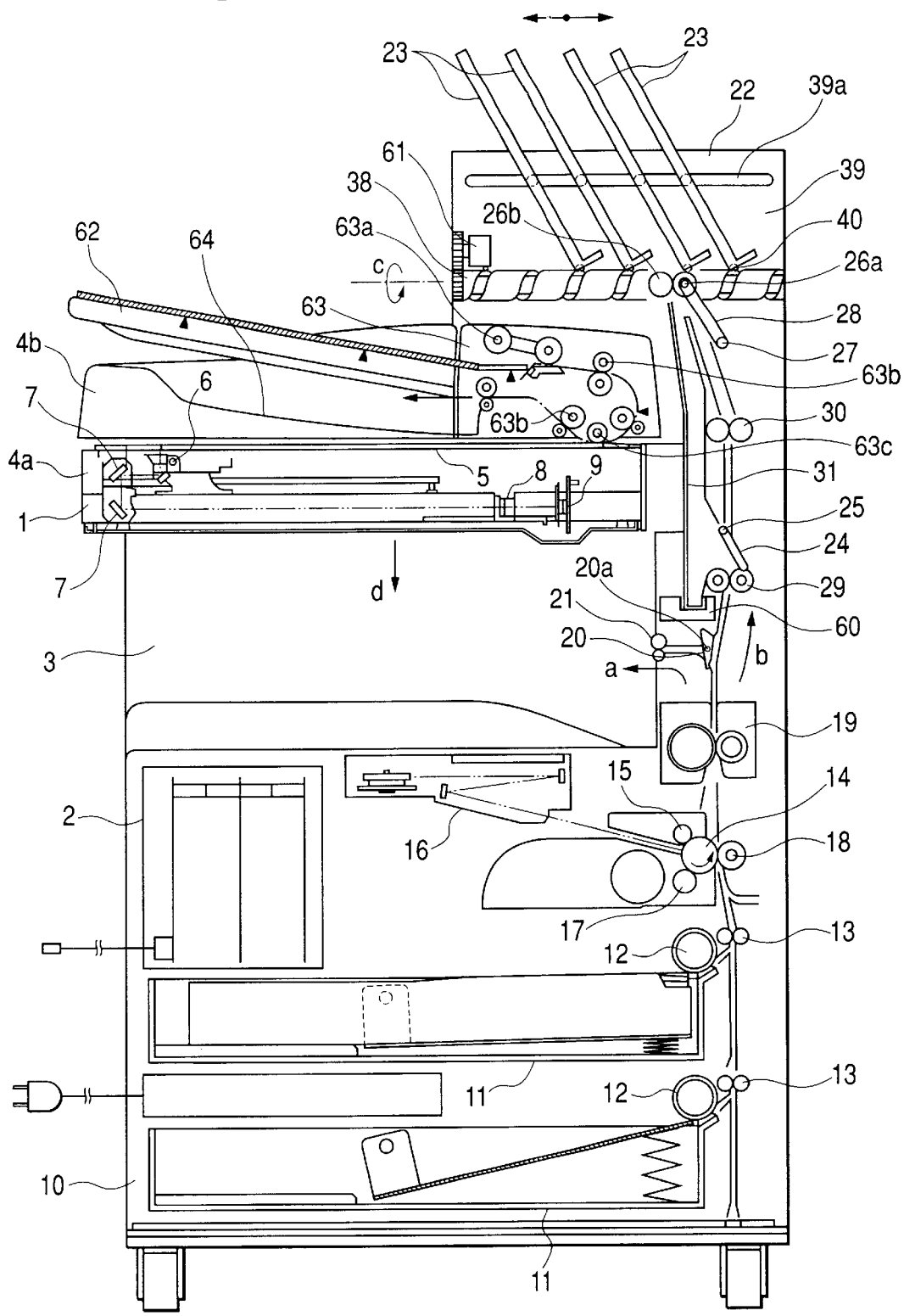
FIG. 1 is a general cross-sectional illustration of an image forming apparatus according to a first embodiment.

FIG. 1 is a general cross-sectional illustration of an image forming apparatus according to a first embodiment.

(General Construction of the Image Forming Apparatus)

This image forming apparatus has an image reading portion 1 which is image reading means, and an image forming portion 2 which is image forming means, and the image reading portion 1 is disposed above the image forming portion 2. A delivery space portion 3 for delivering sheets on which images have been recorded by the image forming portion 2 is formed in the apparatus housing between the two, and this image forming apparatus is an image forming apparatus of the so-called in-body delivery type. Also, above the image forming portion 2, there is provided a sheet treating apparatus for effecting such treatment as punching or stapling on the sheets on which images have been formed.

(Image Reading Portion)

The image reading portion 1 in the present embodiment has an ADF 4b mounted on a scanning optical system 4a for optically reading an original, and exposes and scans an original fed from the ADF 4b onto a platen glass plate 5 or an original directly set on the platen glass plate 5 with the ADF 4b pivotally moved and opened, by the scanning optical system 4a to thereby read the original. That is, the image reading portion 1 applies light to the original on the platen glass plate 5 while scanning a light source 6, and condenses the reflected light therefrom on a photoelectric transfer element 9 through the intermediary of a mirror 7 and a lens 8, and converts it into an electrical digital signal and transmits it. If this digital signal is transmitted to the image forming portion 2 of the apparatus, the apparatus will function as a copying machine, and if the digital signal is transmitted to the image forming portion of other machine, the apparatus will function as a facsimile apparatus.

The image reading portion 1 need not always have the ADF 4b mounted thereon. That is, it may be one provided with an original pressing member for pressing the original set on the platen glass plate 5 of the scanning optical system 4a.

(Image Forming Portion)

The image forming portion 2 serves to form a toner image on a sheet transported from a sheet cassette 11 contained in a sheet feeding portion 10 disposed below the image forming portion 2 by a feed roller 12 and transport rollers 13, by the electrophotographic process. That is, the surface of a photosensitive drum 14 rotated in the direction indicated by the arrow in FIG. 1 is uniformly charged by a charging roller 15, and this photosensitive drum 14 is selectively exposed by a laser scanner 16 for applying light on the basis of image information transmitted from the aforedescribed image reading portion 1 or a personal computer or the like to thereby form a latent image. This latent image is developed into a visible image with a toner by a developing device 17, and the toner image is transferred to the transported sheet by the application of a bias voltage to a transferring roller 18.

The sheet to which the toner image has been transferred in the manner described above is intactly transported to a fixing device 19 located upwardly, and there heat and pressure are applied to the sheet and the toner thereon is fixed, whereafter the sheet is delivered to a predetermined delivery portion.

That is, the sheet which has passed through the fixing device 19 is selected to and transported in the direction indicated by the arrow "a" or the arrow "b" by a first changeover flapper 20 being pivotally moved about a fulcrum 20a (FIG. 1 shows a state in which the direction indicated by the arrow "b" has been selected.).

The selection of the transport direction indicated by the arrow "a" or the arrow "b" is determined by the delivery portion being selected in advance by an operator, and the selection of the delivery portion may be effected from the operating portion of the apparatus or a personal computer in each job, but alternatively may be preset depending on the kind or substance of the job.

For example, in the case of a facsimile output which is small in frequency of use, it is to be understood that the sheet is always delivered from delivery rollers 21 to the delivery space portion 3, and the transport direction is set to the direction indicated by the arrow "a". On the other hand, in the case of the job of copying or a printer in which assortment becomes necessary, one of a plurality of delivery trays 23 provided in a delivery portion 22 located above the image reading portion 1 is selected and set to the direction indicated by the arrow "b".

Also, in the case of a copy job for one copy in which assortment is unnecessary, it is possible to set the delivery space portion 3 as the destination of delivery in order to shorten the output time.

{Sheet Treating Apparatus}

Figure 2:
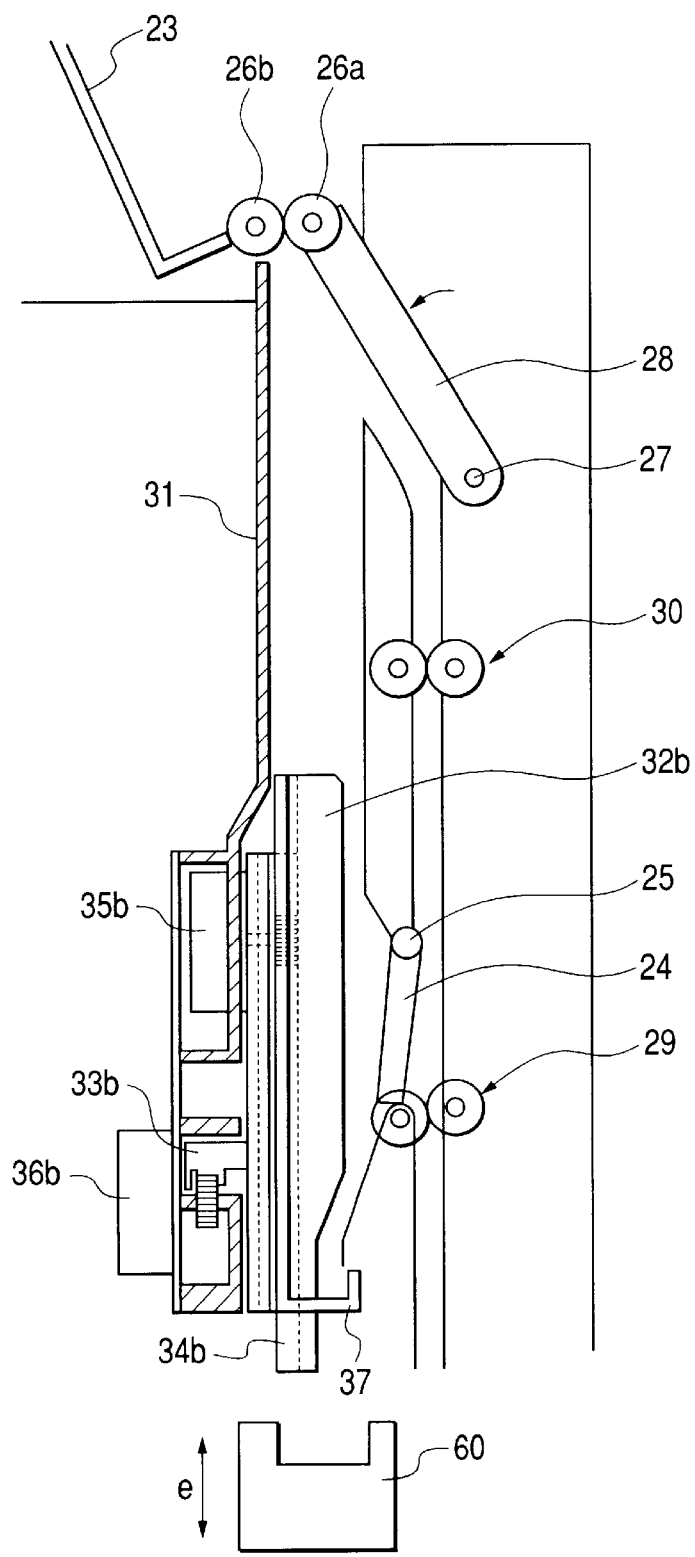
FIG. 2 is a cross-sectional illustration of a sheet post-treating portion when sheet post-treatment is not effected.
Figure 3:
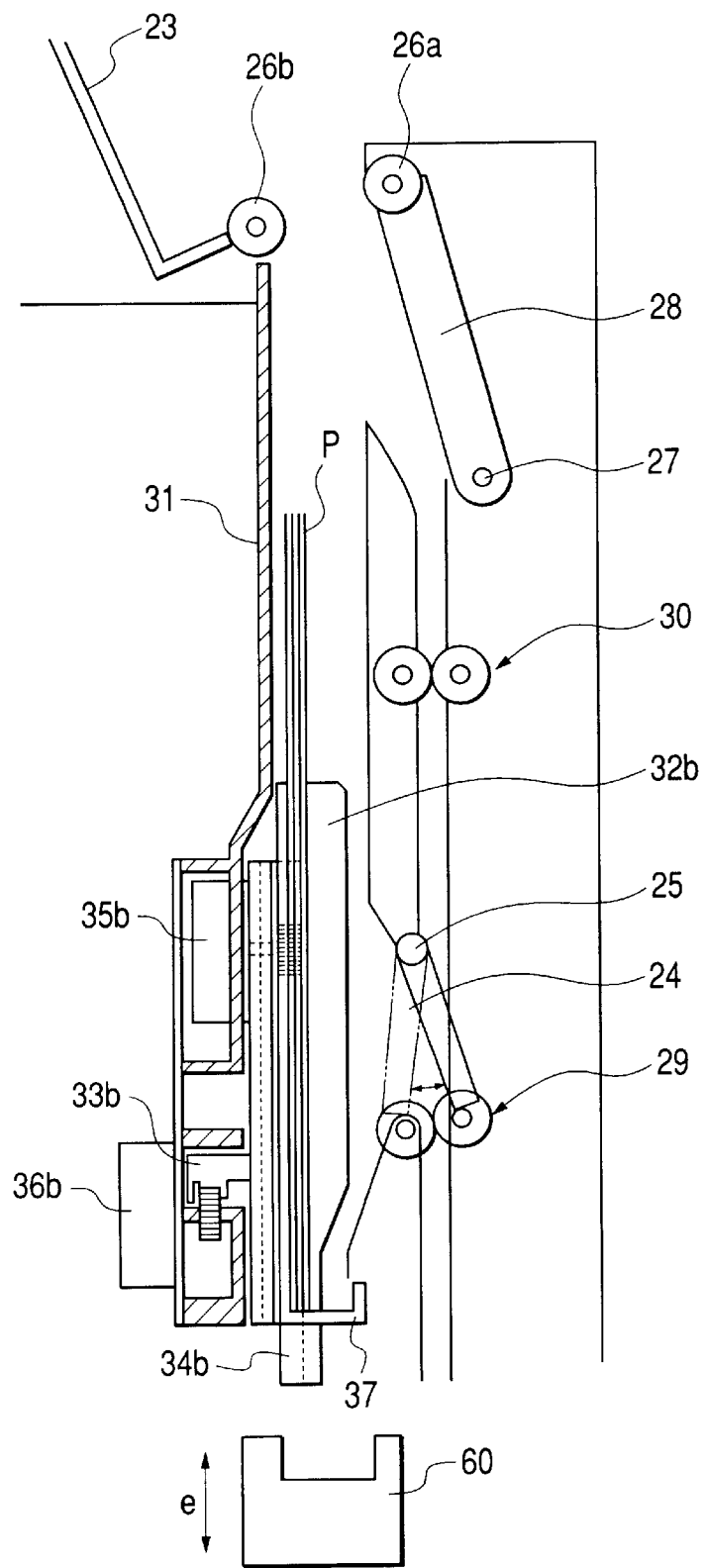
FIG. 3 is a cross-sectional illustration of the sheet post-treating portion when the sheet post-treatment is effected.

The construction of a sheet treating apparatus for effecting the punching treatment or the stapling treatment in the present embodiment will now be described with reference to FIGS. 2 to 6. The sheet treating apparatus in the present embodiment transports sheets on which images have been formed to an intermediate treatment tray 31 having a substantially vertical stacking surface, aligns them into a sheet bundle there, and staples them, and thereafter delivers them to a delivery portion above the tray 31. FIG. 2 is a cross-sectional illustration of a sheet post-treating portion when sheet post-treatment is not effected, and FIG. 3 is a cross-sectional illustration of the sheet post-treating portion when intermediate treatment is effected.

(Transporting Means)

The sheet transported in the direction indicated by the arrow "b" in FIG. 1 by the first changeover flapper 20 has its transport direction changed over by a second changeover flapper 24 depending on the presence or absence of the post-treatment.

That is, in the case of a job which does not require sheet treatment such as stitching or punching, the second changeover flapper 24 is pivotally moved about a fulcrum 25 to a position indicated in FIG. 2. At this time, a sheet-stock delivery roller 26a is supported by a pivotally movable guide 28 pivotally movable about a fulcrum 27, and is pivotally moved to a position indicated in FIG. 2.

The sheets are transported to a pair of sheet-stack delivery rollers 26a and 26b located substantially vertically upwardly by a pair of first transport rollers 29 and a pair of second transport rollers 30, and are delivered to and stacked on the delivery tray 23 located substantially vertically upwardly of the image forming portion 2.

Next, in the case of a job which requires sheet treatment, the second changeover flapper 24 is pivotally moved about the fulcrum 25 to a position indicated by the solid line in FIG. 3, and the sheet P is transported toward the intermediate treatment tray 31. At this time, the pivotally movable guide 28 supporting the sheet-stack delivery roller 26a is pivotally moved about the fulcrum 27 and becomes spaced apart from the sheet-stack delivery roller 26b, and is retracted to a position shown in FIG. 3 during the transport of the sheet to the intermediate treatment tray 31 and during the post-treatment of the sheet.

By the sheet-stack delivery roller 26a being thus retracted, even a sheet of such a large size that during the post-treatment, the leading edge of the sheet goes beyond the sheet-stack delivery roller 26b can be subjected to the post-treating operation on the intermediate treatment tray 31.

Thereafter, when the trailing edge of the sheet P has passed between the pair of first transport rollers 29, the second changeover flapper 24 is changed over to a position shown by the double-dotted line in FIG. 3, whereby the trailing edge of the sheet P is directed toward the intermediate treatment tray 31. At this time, the pair of first transport rollers 29 is set to a sufficient rotational speed for kicking out the trailing edge of the sheet P.

(Sheet Post-Treating Portion)

Figure 4:
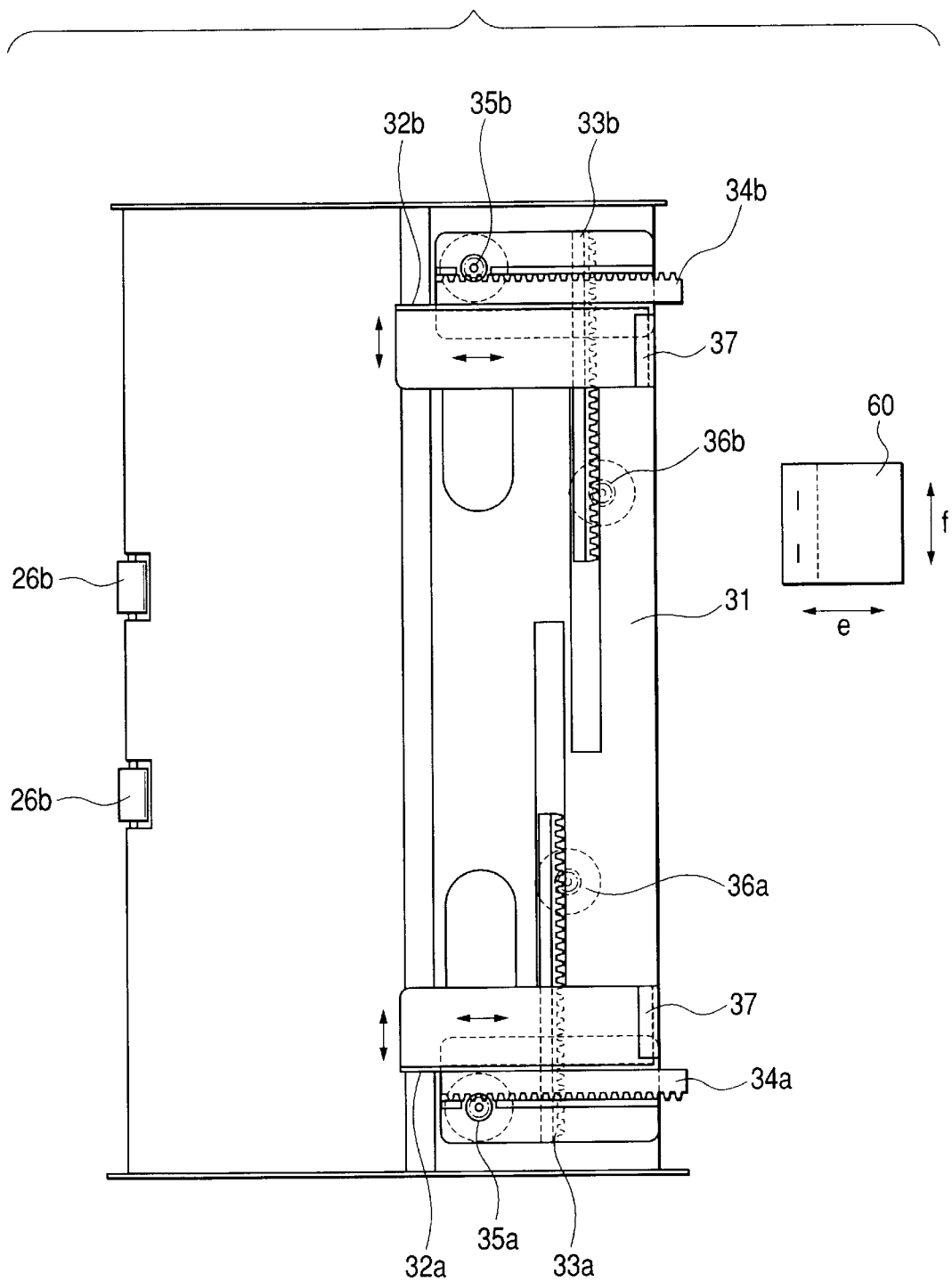
FIG. 4 is an illustration of aligning means.

The sheet P transported onto the intermediate treatment tray 31, as shown in FIG. 3, is held in a substantially vertical state and aligned, and has its lower end portion subjected to the stapling treatment (sheet stitching treatment) by a staple unit 60 provided for movement in the directions indicated by the arrows e and f. For this purpose, as shown in FIG. 4, aligning means for aligning the width of the sheet in the direction toward this side/the inner part of the apparatus each time a sheet is stacked is provided on the intermediate treatment tray 31. FIG. 4 is an illustration of the alignment means showing the cross direction of the sheet (the direction orthogonal to the sheet transport direction) as a vertical direction.

The aligning means, as shown in FIG. 4, is comprised of a front-aligning plate 32*a* for aligning this side (this side in FIG. 1) and a rear-aligning plate 32*b* for aligning the inner part side (the inner part side in FIG. 1) in the cross direction of the sheet. The front-aligning plate 32*a* and the rear-aligning plate 32*b* are provided for reciprocal movement in a vertical direction as viewed in FIG. 4 with width aligning racks 33*a* and 33*b*, respectively, and are designed to be reciprocally moved to right and left as viewed in FIG. 4 by sheet-stack delivery racks 34*a* and 34*b* provided integrally with the front-aligning plate 32*a* and the rear-aligning plate 32*b*, respectively, and sheet-stack delivery motors 35*a* and 35*b* provided on width aligning racks 33*a* and 33*b*, respectively.

The width aligning racks 33*a* and 33*b* are mounted for reciprocal movement in the sheet cross direction of the intermediate treatment tray 31, and are designed to be reciprocally moved in the sheet cross direction by width aligning motors 36*a* and 36*b*, respectively.

Hit reference walls 37 which are the reference during the post-treatment are provided on the lower ends (the right ends as viewed in FIG. 4) of the front-aligning plate 32*a* and the rear-aligning plate 32*b*. Alternatively, the hit reference walls 37 may have a portion thereof fixed to and provided on the intermediate treatment tray 31.

Provision is made of a staple unit 60 for stapling the sheet bundle transported to the intermediate treatment tray 31 and aligned in the sheet cross direction by the aligning means, and this staple unit 60 is designed to be moved in the directions indicated by the arrows f and e in FIG. 4 by driving means (not shown) during stapling and operate, and is provided for movement so as not to shield the transport path of the sheet bundle.

The sheet P transported to the intermediate treatment tray 31, as shown in FIG. 3, hits against the hit reference walls 37 located on the lower end of the intermediate treatment tray with the aid of gravity and is stacked thereon. In the present embodiment, the hit reference walls 37 are provided on the lower ends of the front-aligning plate 32*a* and the rear-aligning plate 32*b* and therefore, when the sheet is transported to the intermediate treatment tray 31, the interval between the front-aligning plate 32*a* and the rear-aligning plate 32*b* is set so as to be wider than the width of the transported sheet and to wait at a waiting position in which they can support the lower end of the sheet having fallen onto the intermediate treatment tray 31 with the aid of gravity by the hit reference walls 37.

Also, the end portions of the hit reference walls 37, as shown in FIG. 3, are bent upwardly so that the sheet P hitting against them may not deviate and fall therefrom, and more particularly, are formed so that their cross-sections may be U-shaped.

When the lower end of the sheet falls in the intermediate treatment tray 31 and hits against the hit reference walls 37, the width aligning motors 36*a* and 36*b* are driven and the drive thereof is transmitted to the width aligning racks 33*a* and 33*b*, and the front-aligning plate 32*a* and the rear-aligning plate 32*b* are moved in the sheet cross direction to thereby effect alignment in the sheet cross direction. When the alignment is completed, the front-aligning plate 32*a* and the rear-aligning plate 32*b* are returned to the waiting position. The sheets successively delivered in this manner are aligned one by one as previously described, and a predetermined number of sheets are stacked on the intermediate treatment tray 31 and becomes a bundle.

The aligned sheet bundle, when for example, an operating portion instructs the staple unit 60 to effect stapling treatment, is stapled by staples being driven into the sheet bundle by the staple unit 60. When the post-treatment such as this stapling is completed, as shown in FIGS. 5 and 6, the front-aligning plate 32*a* and the rear-aligning plate 32*b* are pushed up by the drive of the sheet-stack delivery racks 34*a*, 34*b* and the sheet-stack delivery motors 35*a*, 35*b*, and the sheet bundle P' after the post-treatment is transported by the reference walls 37 formed integrally with the aligning plates 32*a* and 32*b* until at least the leading edge thereof arrives at the pair of sheet-stack delivery rollers 26*a* and 26*b*.

Figure 5:
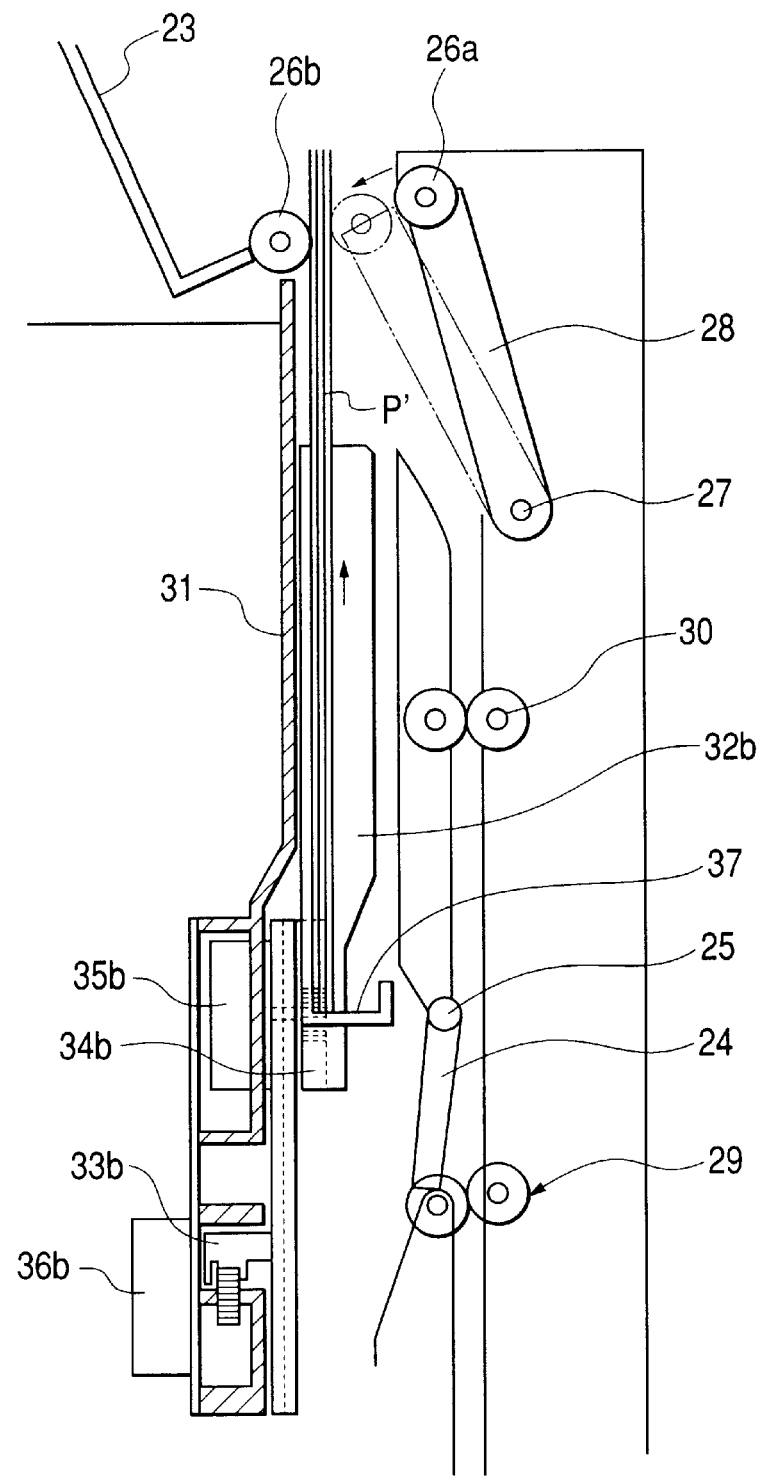
FIG. 5 is an illustration of a state in which an intermediate treatment tray is upwardly moved.
Figure 6:
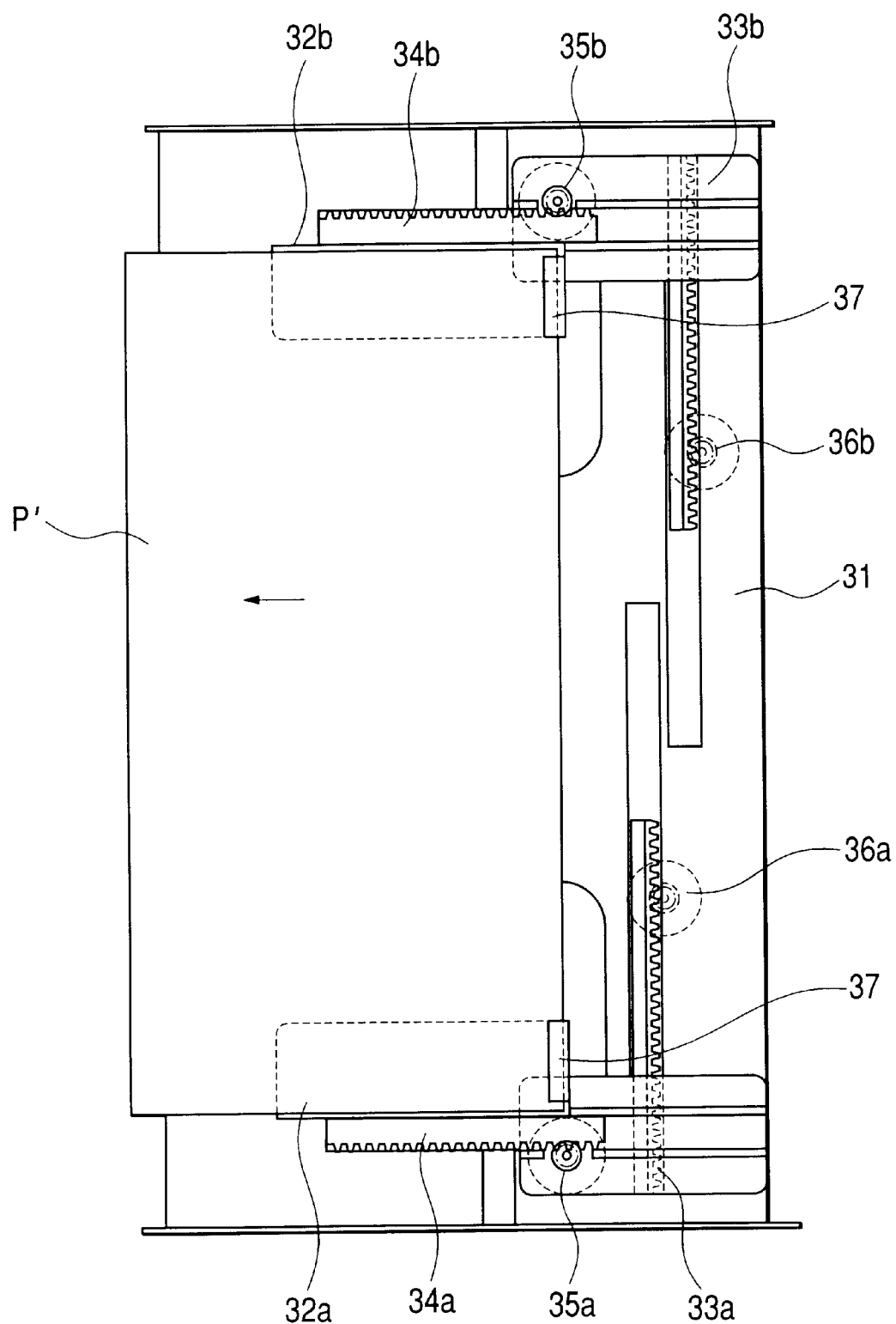
FIG. 6 is an illustration of the state in which the intermediate treatment tray is upwardly moved.

When the leading edge of the sheet bundle P' has passed the sheet-stack delivery roller 26*b*, the pivotally movable guide 28 is pressed to a position indicated by the double-dotted line in FIG. 5, and the sheet bundle P' is delivered to the delivery tray 23 by the pair of sheet-stack delivery rollers 26*a* and 26*b*.

Thereafter, the front-aligning plate 32*a* and the rear-aligning plate 32*b* are downwardly moved by the sheet-stack delivery motors 35*a* and 35*b* being reversely rotated, and when the descent thereof to a predetermined position is detected by a position sensor (not shown), the sheet-stack delivery motors 35*a* and 35*b* are stopped from driving, thus becoming ready for the post-treatment in the next job.

While, in the present embodiment, there is shown an example in which as the sheet post-treatment, stapling treatment is effected by the staple unit, the sheet post-treatment is not restricted to the stapling treatment. For example, it is also possible as a matter of course to provide a punch unit to thereby effect punching treatment (treatment for cutting holes in a sheet).

(Sheet Delivery Portion)

Also, a plurality of delivery trays 23 provided above the image reading portion 1 in the present embodiment, as shown in FIG. 1, are arranged in an obliquely standing state in a lateral direction (a direction intersecting with the sheet delivery direction and in the present embodiment, a horizontal direction), and are designed to be moved to right and left by a lead cam 38 with a spiral groove rotated in the direction indicated by the arrow "c" by a drive source 61, and a guide rail 39*a* provided on a rear side plate 39 supporting the rear sides of the delivery trays 23.

That is, rollers 40 engaged with the groove of the lead cam 38 are provided on the lower portions of the front and rear ends of the respective delivery trays 23, and the delivery trays 23 are movable in a lateral direction by the rotation of the lead cam 38. The positions of the trays are detected by a position detecting sensor (not shown), and the trays are stopped at predetermined positions, whereby the sheet or the sheet bundle delivered by the pair of sheet-stack delivery rollers 26*a* and 26*b* is delivered to a predetermined delivery tray 23.

The above-described delivery, in the case of the sort mode, is effected with the sheets sorted to a plurality of delivery trays 23 by the respective delivery trays 23 being successively moved with the delivery of the sheets. On the other hand, in the case of the non-sort mode, the rightmost delivery tray 23 shown in FIG. 1 is moved to a position for receiving delivered sheets, and the sheets are delivered to that tray.

As previously described, a plurality of delivery trays are arranged in the lateral direction and therefore, the delivered sheets can be easily taken out. Also, the delivered sheets are supported by the delivery trays 23 and therefore become obliquely erect, and even if the sheet size is large, any lateral delivery space is not required.

{Opening and Closing of the Image Reading Apparatus}

In the present embodiment, as previously described, the delivery trays 23 are disposed above the image reading portion 1 and therefore, if an attempt is made to upwardly open the entire image reading portion, it may strike against the delivery trays 23. Therefore, the opening and closing construction of the image reading portion is designed as follows.

(Opening and Closing of the Original Pressing Portion)

The ADF 4b functioning also as an original pressing portion disposed on the scanning optical system 4a in the present embodiment can also read an original by the sheet-through type. That is, in FIG. 1, sheet originals set on an original tray portion 62 are U-turn-transported one by one by an original transporting portion 63 comprised of rollers such as a pickup roller 63a, transport rollers 63b and an original pressing roller 63c and an original guide and are delivered to a delivery tray portion 64. Prior to this U-turn transport, the light source 6 and scanning mirror 7 of the scanning optical system 4a are moved to a position opposed to the original pressing roller 63c, and light is applied to a transported original to thereby read the original.

In the above-described construction, the original transporting portion 63 is fixed to the main body of the apparatus, and an upper delivery portion 22 is located in the upper portion thereof. On the other hand, the original tray portion 62 and the delivery tray portion 64 are divided from the original transporting portion 63, and the sheet delivery portion 22 is not located in the upper portion thereof. The original tray portion 62 and the delivery tray portion 64, as shown in FIGS. 7A and 7B, are pivotally movable about a rotary hinge portion 42 integrally with each other and upwardly openable relative to the scanning optical system 4a.

Therefore, when a book original or the like is to be read, the original tray portion 62 and the delivery tray portion 64 can be opened while the scanning optical system 4a remains fixed, and the book original can be set on the platen glass plate 5 and read. At this time, the original tray portion 62 and the delivery tray portion 64 act as an original pressure contact portion.

The openable and closable original pressing portion is formed by only trays (the original tray portion 62 and the delivery tray portion 64) and is therefore light in weight, and has the advantages that the construction of the hinge or the like can be simplified and that operability is also excellent.

(Opening and Closing of the Scanning Optical System)

Also, in the present embodiment, as shown in FIGS. 8A and 8B, it is possible to construct the scanning optical system 4a so as to be movable to the delivery space portion 3 (movable in the direction indicated by the arrow "d" in FIG. 1). FIGS. 8A and 8B are side illustrations of the main body of the image forming apparatus according to the present embodiment as it is seen from its left side.

As shown in FIGS. 8A and 8B, the image reading portion 1 having the ADF 4b fixed to the housing 41 of the apparatus and provided with the scanning optical system 4a is constructed so that the scanning optical system 4a portion may be pivotally movable relative to the ADF 4b with the rotary hinge portion 42 as the fulcrum, and in a normal state, it is pulled up to and fixed at a position shown in FIG. 8A by a tension spring 43.

When the operator places an original on the platen glass plate 5 of the image reading portion 1 and effects image reading, if the operator depresses a handle 44 provided on the scanning optical system 4a on the front side of the apparatus, the scanning optical system 4a portion is rotatively moved to the area of the delivery space portion 3 with the rotary hinge portion 42 as the center and the platen glass plate 5 becomes exposed. In this state, the original is set in alignment with the hit reference 5a formed on the platen glass plate 5 on the front side of the apparatus.

When the operator returns the scanning optical system 4a with the handle 44 held in his hand, the scanning optical system 4a becomes pressed against the ADF 4b by the tensile force of the tension spring 43, as shown in FIG. 8A, and in this state, scanning and reading are effected.

The tension spring 43 is restrained between the original transporting portion 63 fixed to the main body of the apparatus and the scanning optical system 4a, and when as previously described, the original tray portion 62 and the delivery tray portion 64 are upwardly opened, the tensile force of the tension spring 43 does not act.

Also, the rotary hinge portion 42 is movable within the range of a longitudinally long slot 45 formed in the housing 41 of the apparatus, and is biased toward the upper edge side of the longitudinally long slot 45 by a compression spring 46. Therefore, when as shown in FIGS. 9A and 9B, a thick book original G is set on the platen glass plate 5, the compression spring 46 provided on the rotary hinge portion 42 of the image reading portion 1 contracts, whereby the thick original is pushed against the platen glass plate in parallelism to the platen glass plate.

As described above, the image reading portion 1 is made movable to the area of the delivery space portion 3, whereby it becomes possible to set the original without moving the delivery tray 23 disposed in the upper portion of the image reading portion 1. Therefore, the space saving of the apparatus becomes possible without spoiling the visual confirmability and taking-out operability of the sheet delivered to the delivery tray 23.

When an original extending over the entire platen glass plate 5 is to be set, as shown in FIGS. 8A and 8B, the original can be set with the ADF 4b fixed and the scanning optical system 4a opened toward the delivery space portion 3 side, and when an original of such a degree of size as does not extend to the original transporting portion 63 is to be set, as shown in FIGS. 7A and 7B, the original can be set with the scanning optical system 4a fixed and the original tray portion 62 which is an original pressing portion and the original transporting portion 63 upwardly opened.

Second Embodiment

Figure 10:
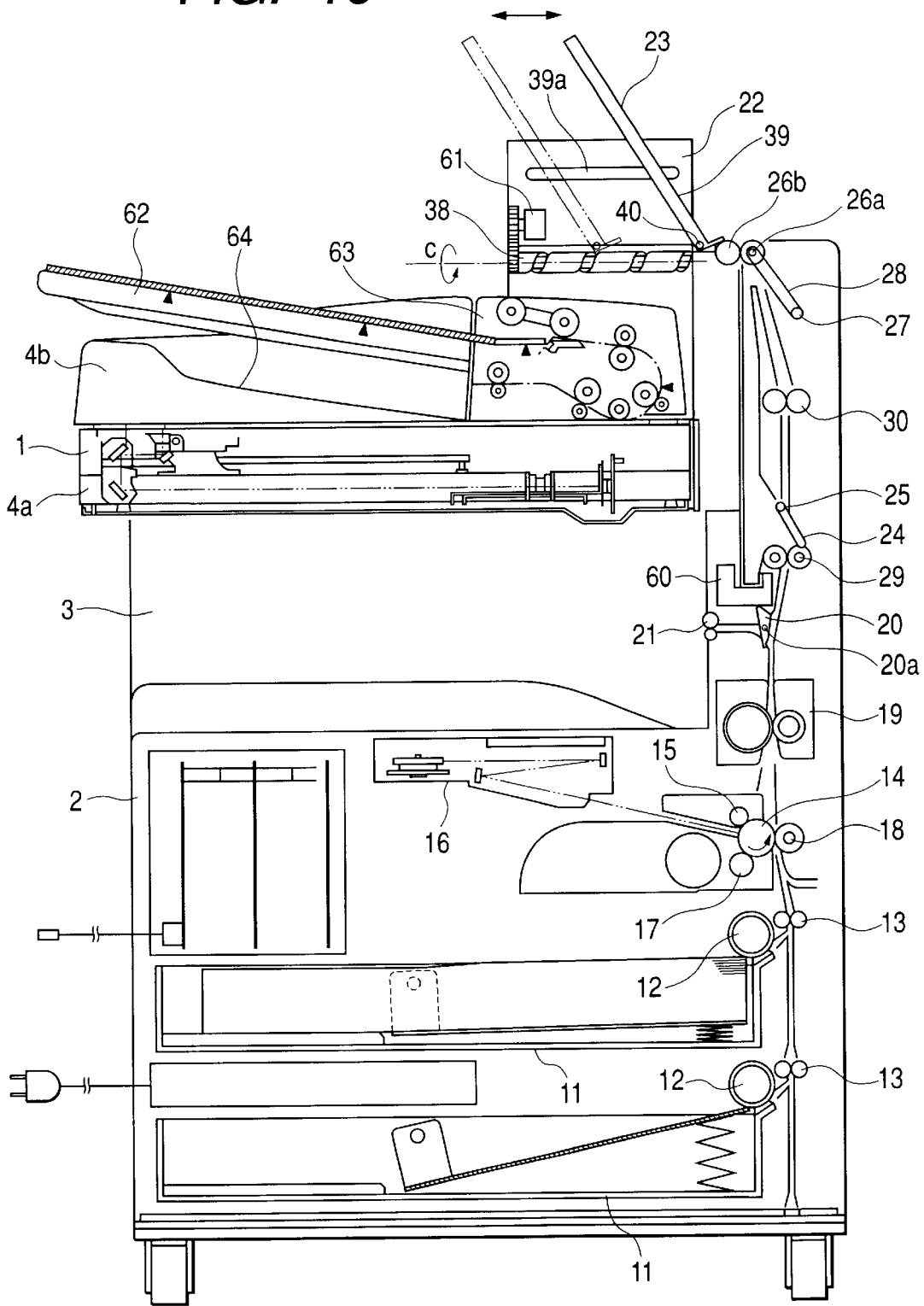
FIG. 10 is a general cross-sectional illustration of an image forming apparatus according to a second embodiment in which a delivery tray is used.

While in the above-described first embodiment, there has been shown an example in which the plurality of delivery trays 23 are provided in the delivery portion 22 disposed above the sheet post-treating portion, there may be adopted a construction in which a single delivery tray 23 is provided in the delivery portion 22, as shown in FIG. 10. FIG. 10 is a typical illustration of an image forming apparatus according to a second embodiment, and in FIG. 10, members functionally similar to those in the first embodiment are given the same reference characters.

In the present embodiment, the delivery tray 23 is moved in conformity with the amount of sheets delivered to the delivery portion 22, and the delivered sheets are held in their erect state.

Third Embodiment

Figure 11:
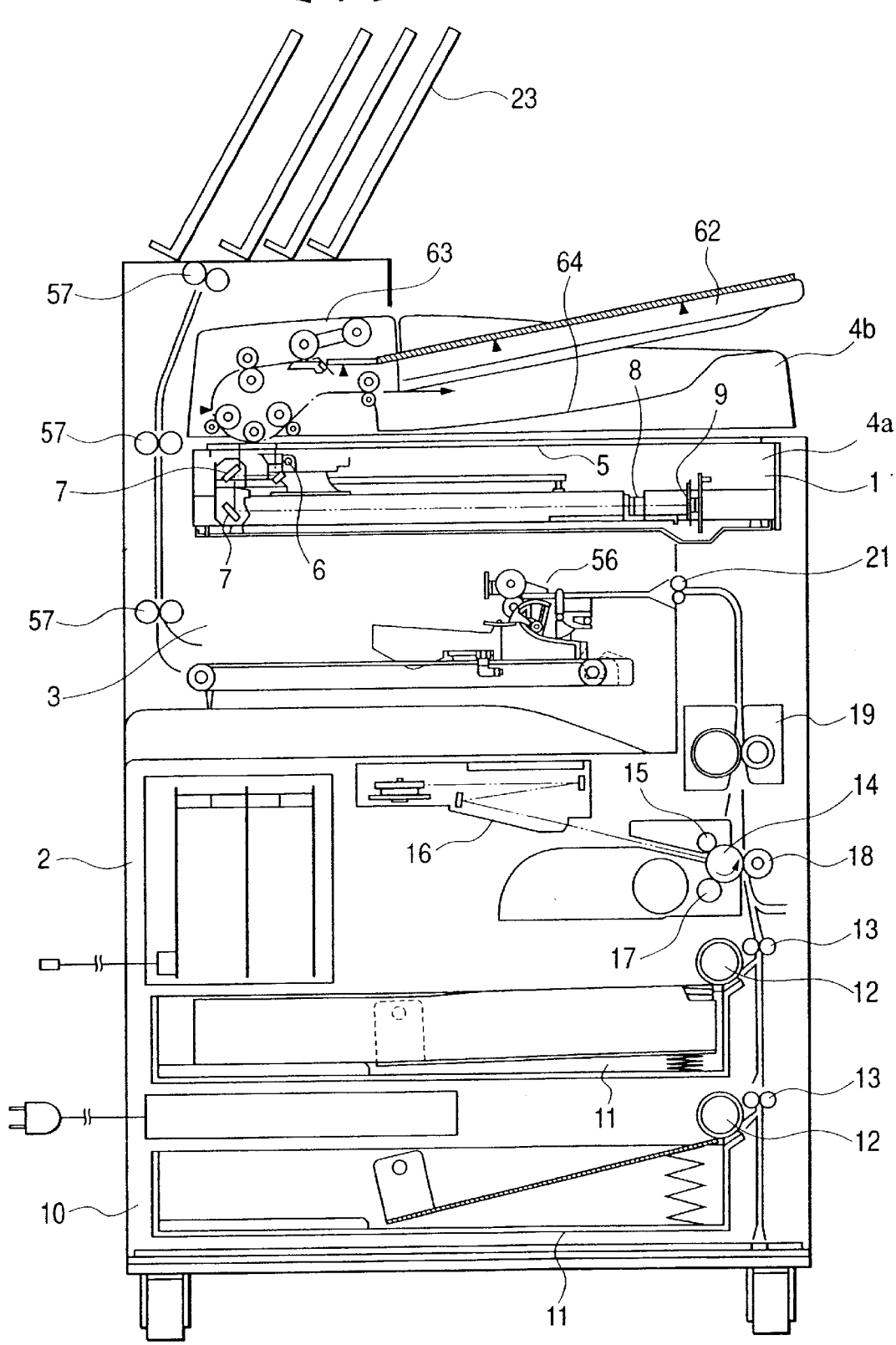
FIG. 11 is an illustration of the construction of another form of movement of an image reading portion according to a third embodiment.
Figure 12:
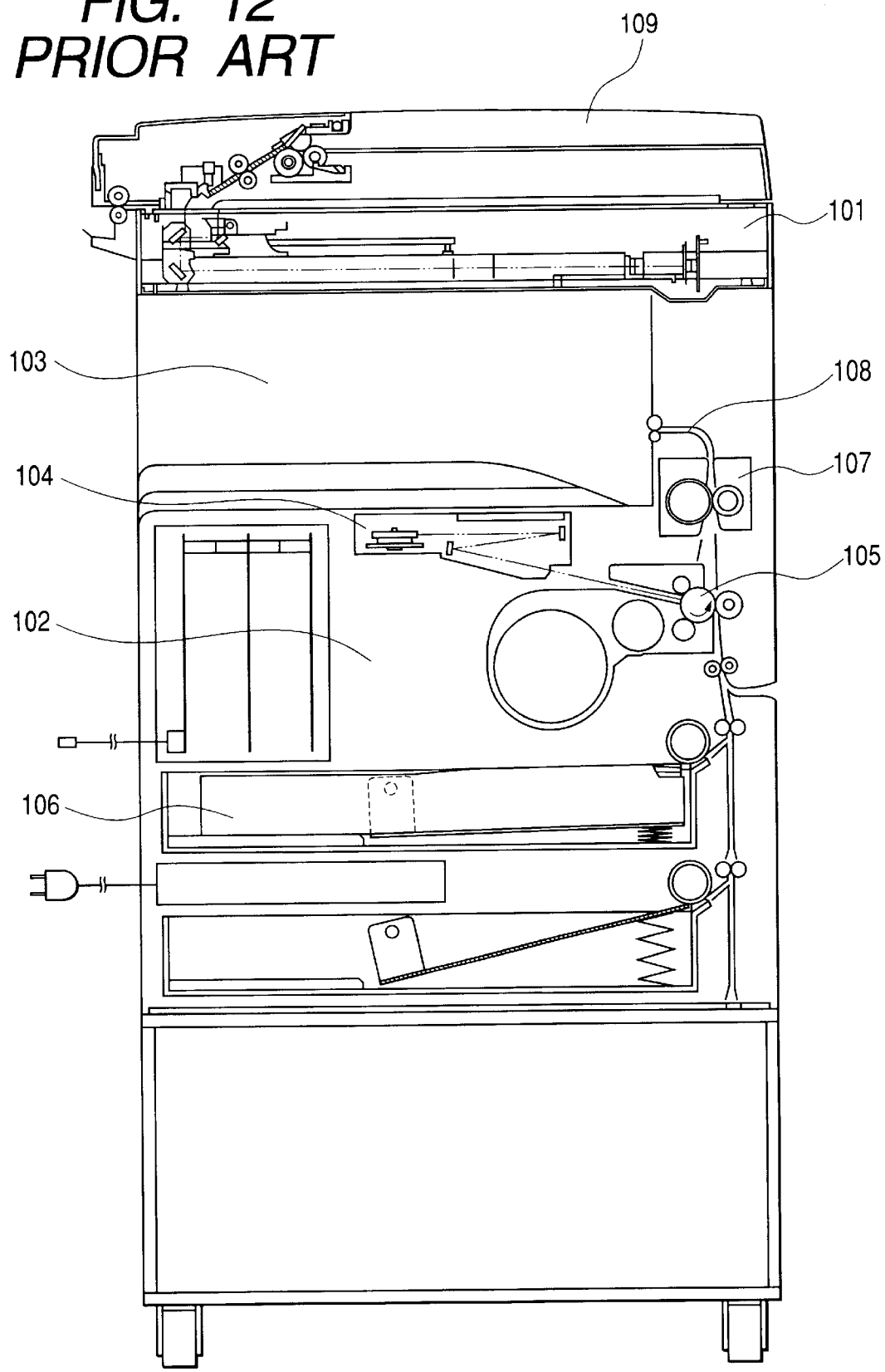
FIG. 12 is an illustration of an image forming apparatus according to the prior art.
Figure 13:
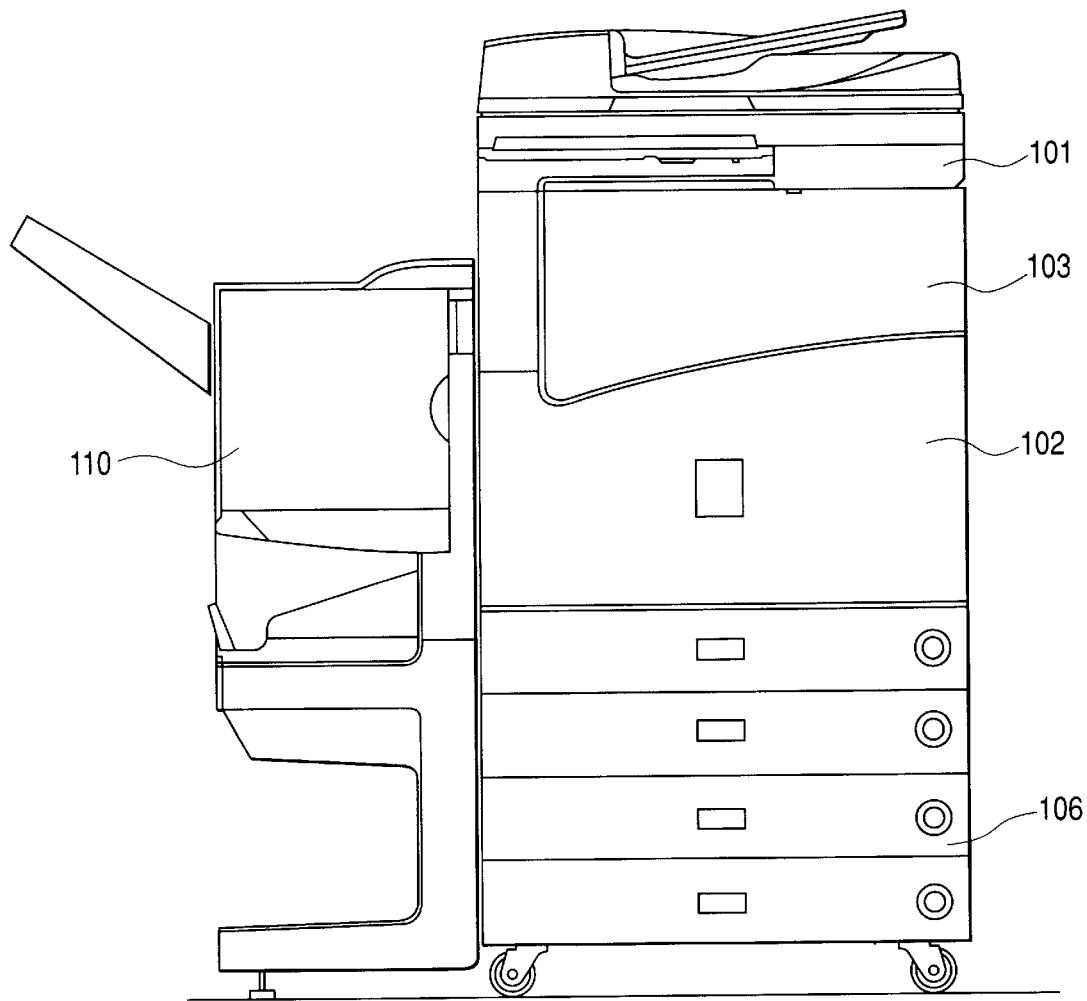
FIG. 13 is an illustration of a sheet treating apparatus as it is connected to a side of the main body of the apparatus.

FIG. 11 is a typical illustration of an image forming apparatus according to a third embodiment, and shows an example in which the sheet treating apparatus is disposed in the delivery space portion 3. In the other points, the construction of the present embodiment is similar to that of the aforedescribed first embodiment (members functionally similar to those in the first embodiment are given the same reference characters).

In this embodiment, the sheet passed through the fixing device 19 and between the main body delivery rollers 21 is subjected to the post-treatment such as the stapling by the stapler in a sheet post-treating portion 56, whereafter it is delivered to and stacked on the delivery tray 23 disposed above the image reading portion 1 by delivery rollers 57.

The sheet post-treating portion 56, as in the aforedescribed first embodiment, aligns sheets successively transported to the sheet post-treating portion 56 by the delivery rollers 21 in the cross direction thereof by the aligning means and makes them into a sheet bundle, which is then staple-treated by the staple unit, whereafter the sheet bundle is gripped and transported by a gripper (not shown), and is further transported upwardly and delivered to the delivery trays 23 by delivery rollers 57.

Also, the image reading portion 1 is designed to be capable of being pulled out to this side with respect to the main body of the apparatus, and when reading is to be effected by the image reading portion 1 with the ADF 4b opened, the operation is performed with the image reading portion 1 pulled to this side.

In the present embodiment, the sheet post-treating portion 56 is disposed substantially horizontally in the delivery space portion 3 and the sheet can be treated while being made substantially horizontal and therefore, the installation of various sheet treating apparatus for stapling of large capacity, two-spot stitching, punching, etc, becomes possible.

What is claimed is:

1. An image forming apparatus comprising:

an image reading portion for reading an image;

an image forming portion disposed below said image reading portion for forming an image on a sheet; and a sheet delivery portion provided above said image reading portion, wherein said image reading portion is provided with an auto original feeder, and said auto original feeder is divided into an upwardly openable and closable original pressing portion and an original transporting portion.

2. An image forming apparatus according to claim 1, wherein said original pressing portion formed by an original tray and an original delivery tray.

3. An image forming apparatus according to claim 2, wherein said original transporting portion transports the original in a U-turn from said original tray to said original delivery tray.

4. An image forming apparatus according to claim 1, wherein said sheet delivery portion is located above said original transporting portion, and a portion above said original pressing portion is opened.

5. An image forming apparatus according to claim 4, wherein said sheet delivery portion comprises at least one delivery tray disposed in a lateral direction.

6. An image forming apparatus according to any one of claims 1, 2, 3, 4, or 5, further comprising a sheet delivery space portion provided in a housing of the apparatus between said image reading portion and said image forming portion.

* * * * *

UNITED STATES PATENT AND TRADEMARK OFFICE
CERTIFICATE OF CORRECTION

PATENT NO. : 6,731,903 B2
DATED : May 4, 2004
INVENTOR(S) : Toshimasa Suzuki

It is certified that error appears in the above-identified patent and that said Letters Patent is hereby corrected as shown below:

Column 2,
Line 9, "remain" should read -- remains --.

Column 5,
Line 40, "operate," should read -- operation, --.

Column 6,
Line 6, "becomes" should read -- become --.

Column 8,
Line 30, "in" should be deleted.
Line 31, "parallelism" should read -- parallel --.
Line 44, "does" should read -- it does --.

Signed and Sealed this

Seventeenth Day of August, 2004

JON W. DUDAS
*Acting Director of the United States Patent and Trademark Office*